May 20, 1952  S. L. GOOKIN  2,596,993
METHOD AND MOLD FOR COVERING OF EYELETS BY PLASTIC INJECTION
Filed Jan. 13, 1949  3 Sheets-Sheet 1

Inventor
Sylvester L. Gookin
By his Attorney

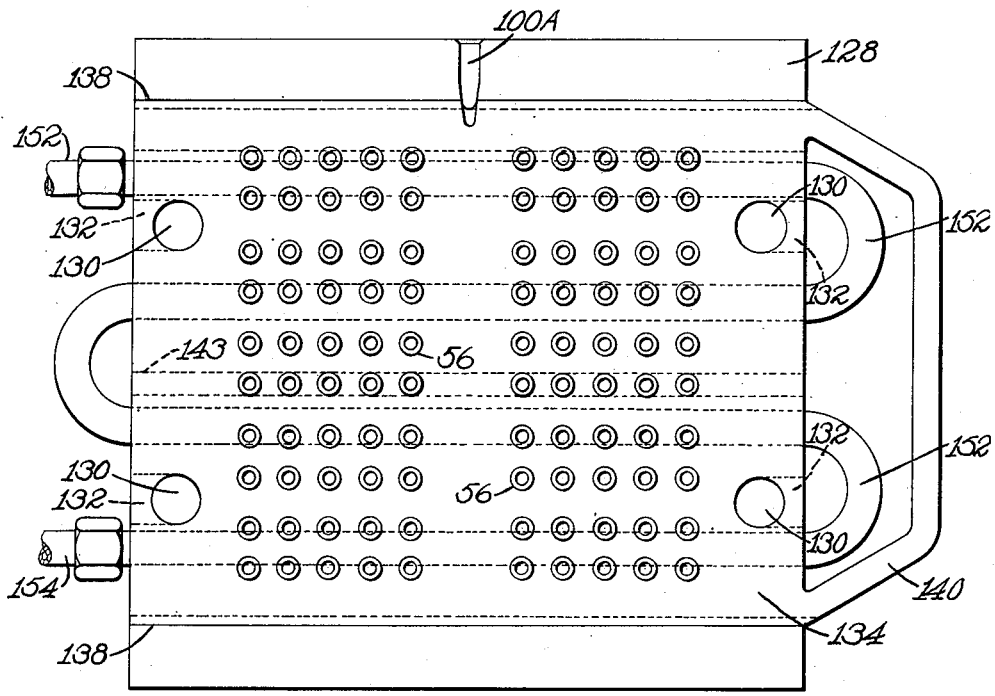
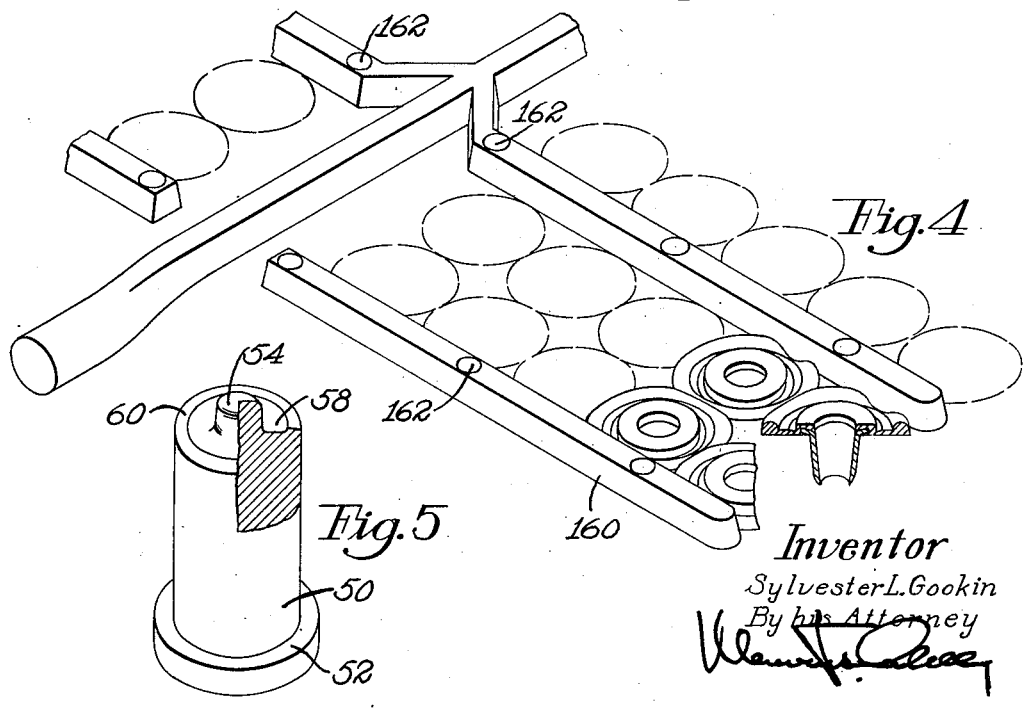

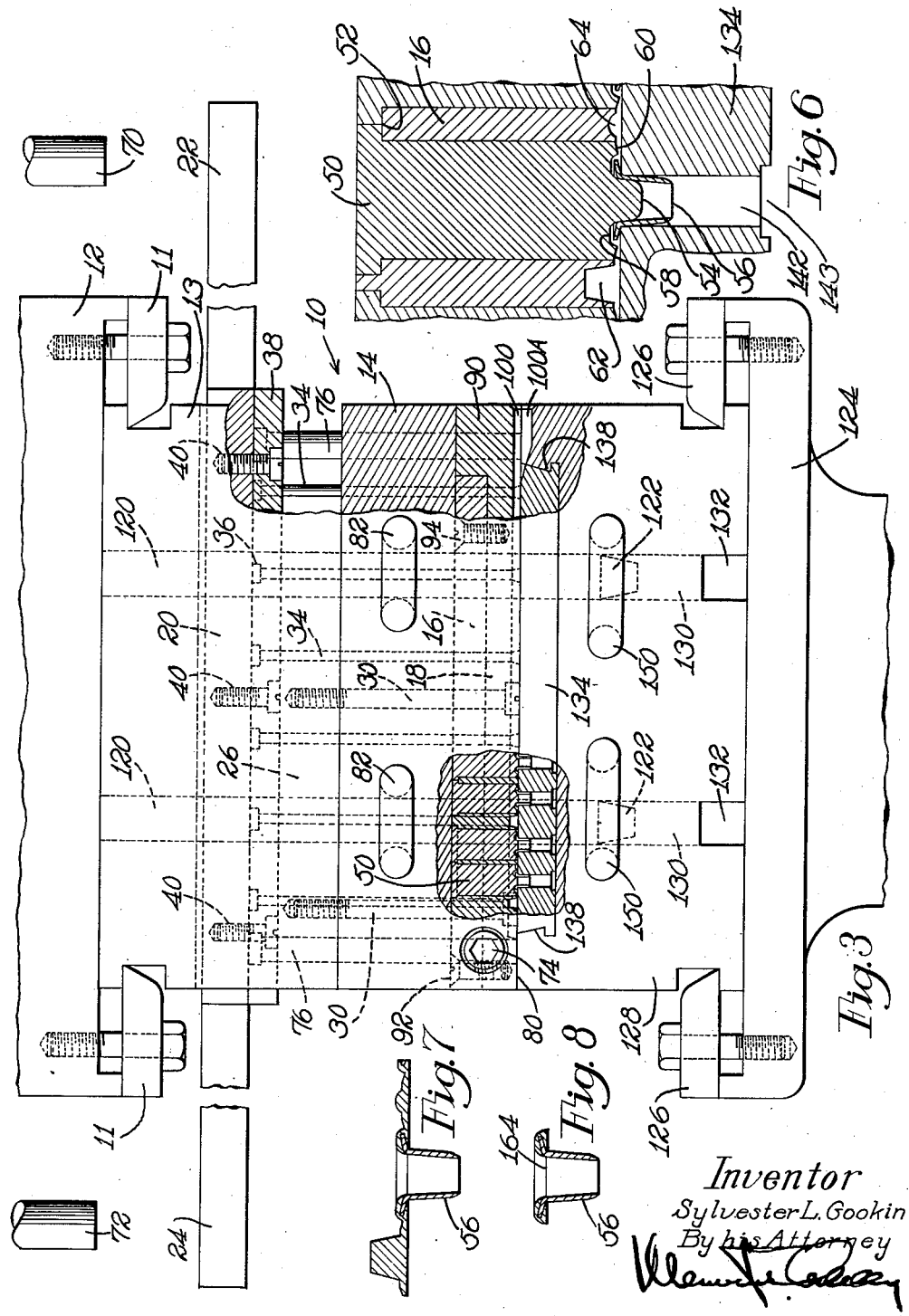

Patented May 20, 1952

2,596,993

UNITED STATES PATENT OFFICE 2,596,993

METHOD AND MOLD FOR COVERING OF EYELETS BY PLASTIC INJECTION

Sylvester L. Gookin, Quincy, Mass., assignor to United Shoe Machinery Corporation, Flemington, N. J., a corporation of New Jersey Application January 13, 1949, Serial No. 70,704

5 Claims. (Cl. 18—36)

This invention relates to methods of and means for making eyelets or similar articles, and more particularly to the covering of the metal flanges of such articles with a plastic material and to a mold which may be employed in forming such coverings.

Eyelets of plastic materials have been found advantageous for many uses and a common reason for their selection is their jewel-like appearance, and another strong reason is the wide choice of colors and effects which may be had. It has been found, however, that an all-plastic eyelet is generally lacking in strength and permanence, both qualities being necessary for some uses. Various attempts have been made to secure improved eyelets by covering the flanges of metallic eyelet blanks with plastic resin by way of compression molding and thereby retain advantageous characteristics of both plastic and metallic materials. The United States Letters Patent No. 1,188,423, granted June 27, 1916, in the name of William S. Elliot, discloses an example of the methods tried. As eyelets are usually small in size, must be accurately made, and must be produced in quantity for commercial purposes, the difficulties encountered have discouraged the use of plastic covered eyelets. In covering eyelets, the compression molding method as taught in the patented art is not only wasteful of material but is too slow for successful commercial use. Another difficulty in the past has been the inability to obtain a sufficiently high percentage of perfect eyelets to warrant commercial use of such methods. Thus, if the plastic material is first placed in the mold and then compressed by a subsequent closure of the mold, the pinched or cut-off eyelets often show slightly irregular or rough edges terminating within the eyelet barrels. This roughness can be seen by close examination and is a potential source of difficulty in the use of the eyelets. The roughness or irregularity may cause the plastic material to tear loose from the supporting metal of the eyelet blank or it may cause undue wear, for example, on shoe laces. There have been instances, in the use of the compression molding method, in which as high as 35% of the production has been rejected because of imperfections.

The general object of the present invention is to provide an improved method of making eyelets or similar articles the flanges of which are covered by plastic material and also a novel mold which advantageously may be used in carrying out the improved method.

The method aspect of the present invention is particularly important and interesting in that it has now been discovered that improved plastic covered metallic eyelets possessing smooth surfaces may be made by the injection molding method with substantially no culls and in such quantities as to make the method commercially feasible. The method has been found feasible despite the small amount of plastic material used for each injection operation, the very thin sections of plastic material which must be formed consistently and without imperfections and also despite the very appreciable premature cooling effect of the metal eyelet blanks. It will be understood that these latter conditions are difficult to contend with as the cooling or setting of the plastic material is extremely rapid (substantially instantaneous) and the slightest premature cooling of merely a very small amount of plastic in any localized part of the mold would preclude successful operation.

The method of the present invention may be carried out with advantage by confining a loading of a large number of eyelet blanks in spaced relation near or at the parting plane of a two-part or two-block mold for simultaneous coverage with the injection of a single charge of plastic material. The latter material (which may be ethyl cellulose, cellulose acetate or some other suitable resin) is preferably injected at the parting plane of the two mold blocks and is constrained (by cavities defined in the closed mold as well as by its own disinclination to deviate from a straight path because of its viscosity and rate of flow) to follow a distribution pattern such as to cause the material to flow first to the zone of eyelet blanks most remote from the point of injection and then progressively to flow to the remaining less remote zones successively toward the point of injection. This progressive flow to the various zones of each injected charge prevents undesired and premature blockage at any point in the mold and assures a complete treatment of each full loading of eyelet blanks and the production of consecutive and accurately made eyelet clusters with a minimum of culls and flashes.

In accordance with the mold aspect of the invention a two-part or two-block mold is used near or at the parting plane of which, when the two parts are placed in juxtaposition, the eyelet blanks are firmly held in spaced relation. Cavities are defined which make up a distribution pattern of a sprue passage communicating with runners, ring gates and flange spaces to lead the injected material to the individual flanges. The intersections of the sprue passage with some of the runners are so arranged as to avoid diversion to a less remote runner of any plastic material intended for a more remote runner until such remote runner and the more remote portions of the cavities are filled. The plastic material subsequently and progressively flowing to some of the eyelet blanks or their ring gates, which are not as remote, is constrained to flow around an angle of less than 90°.

These and other features of the invention including various specific details of construction of the method and of the mold will now be described in detail in the specification and then pointed out more particularly in the appended claims.

In the drawings,

Fig. 2 is a plan view of the lower mold part or block with a removable flat plate holding 100 spaced metallic eyelet blanks;

Fig. 3 is an elevational view partially in section of the mold blocks placed in juxtaposition between the jaws of a press and ready for an injection operation;

Fig. 4 is an enlarged perspective view, partially in section, of part of an eyelet cluster produced in the practice of the novel method herein disclosed;

Fig. 5 is an enlarged perspective view, partially in section, of one of the die tools shown in Fig. 1;

Fig. 6 is an enlarged sectional view of a portion of the structure shown in Fig. 3;

Fig. 7 shows a section through a part of the eyelet cluster and drawn to the same scale as Fig. 4; and Fig. 8 is an enlarged and sectional view of a finished eyelet with its flange covered with plastic material.

Figure 1:
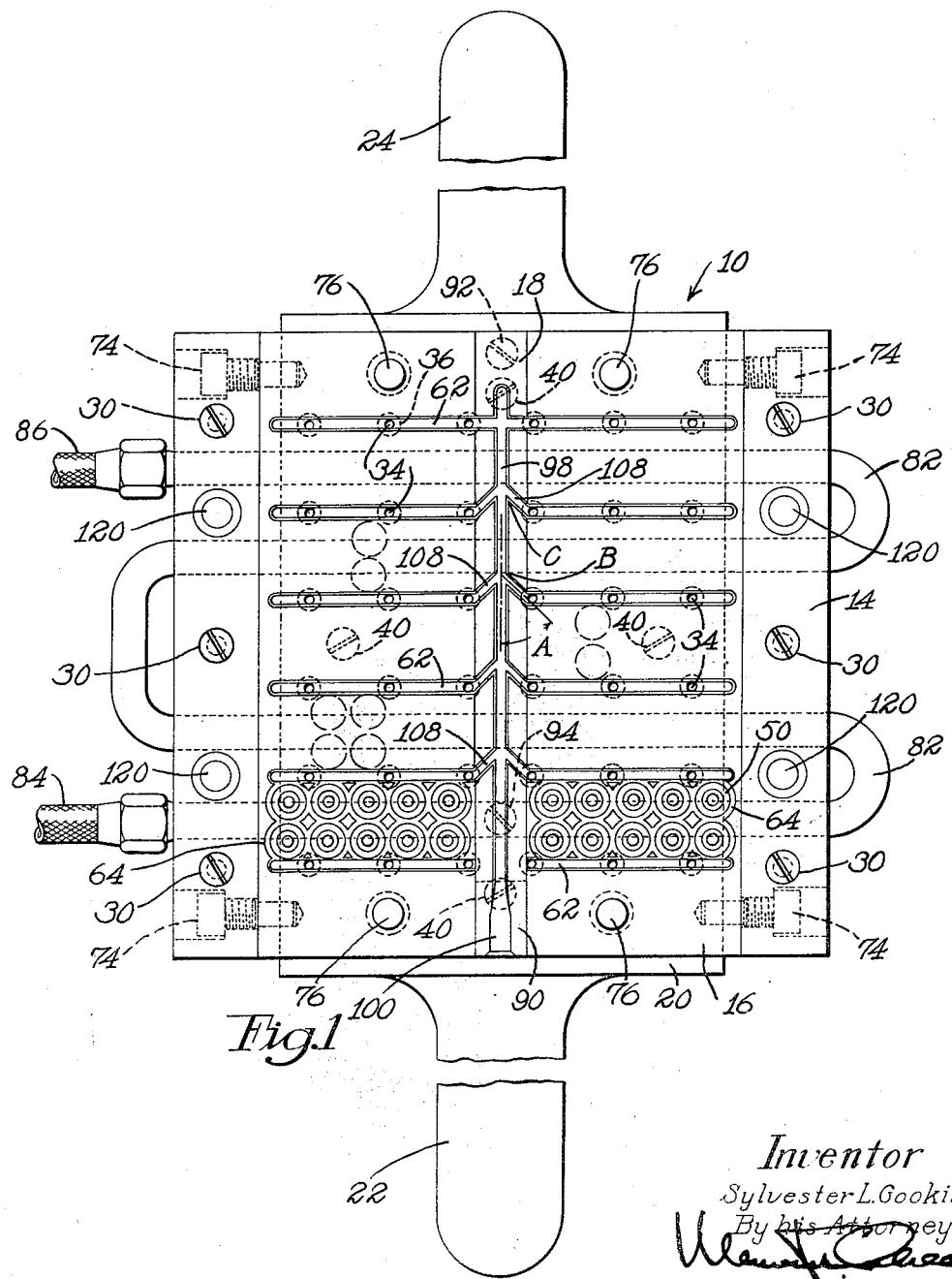
Fig. 1 shows the bottom side of the upper part or block of the novel mold of the present invention.

In arriving at a general understanding of the novel two-part mold construction, it should be noted that Fig. 1 shows the upper part and Fig. 2 shows the lower part whereas Fig. 3 shows the two parts placed in juxtaposition as set forth above in the description of the figures.

The upper part or block 10 of the mold (Figs. 1 and 3) is of such construction that it is subject to attachment by means of dogs 11 to the upper or vertically movable jaw 12 (Fig. 3) of a press. The block 10 includes a carrier section 13, a heated portion 14, a tool carrying block 16, and a sprue member 18, and also restricts the movement of a knock-out plate 20 having horizontal protruding ears 22 and 24. The plate 20 is supported in a space or channel 26 cut through from one side to the opposite side of the carrier section 13 and is at times subject to vertical movement relative to the block 10 as will further appear. The heated portion 14 is firmly held to the carrier section 13 by means of six vertical bolts 30 the flat heads of which present surfaces which are flush with the under sides of the side walls depending as parts of the heated portion 14.

The space 26 is of sufficient height so that the plate 20 may move up and down therein depending upon whether the mold is closed or open. Thirty-six knock-out pins 34 are each provided with an enlarged head 36 (Fig. 3) and these pins are suspended through and from a plate 38 which, in turn, is attached to the knock-out plate 20 by means of four set screws 40. The knock-out pins 34 are arranged to slide freely and as a group (when plates 20 and 38 are vertically actuated) in passages provided for them through the block 14 and the tool carrying part 18 and they terminate just above the parting line of the mold when the mold is closed as will further appear.

Die tools 50 such as the one in Fig. 5 (there are one hundred of them in the particular embodiment shown) are supported in the carrying block 16, and these die tools are arranged in ten sets of ten tools each, as best seen in Fig. 1. Each die tool 50 is cylindrical and is provided with a shoulder 52 arranged to bear on recessed portions of the member 16 (see Fig. 6). The lower end of each die tool 50 is provided with a depending projection 54 proportioned to fit snugly within the barrel of a metal eyelet blank 56 (Fig. 6) to be treated. An annular groove 58 for shaping the finished eyelet flange is formed in the tool 50 to surround the projection 54 and concentric with that groove 58 is a shoulder 60 which is inclined in a somewhat conical fashion toward the projection 54. The tool carrying block 16 is provided with runners 62 and one hundred annular ring gates or spaces 64 (Figs. 1 and 6). It is to be understood that each ring gate or space 64 is concentric with a projection 54 and intersects one of the runners 62 as well as two or three adjacent ring gate spaces. The height of the runners 62 is such that, when the mold is closed and the knock-out plate 20 is raised for injection to begin, the pins 34 terminate at the points of intersection with those runners. The carrying block 16 is held in position within the heated portion 14 by four Allen screws 74 passing through the depending sides of portion 14 and into the block 16. In addition to the knock-out pins 34 the plate 20 also supports four pins 76 which are arranged to slide freely through the parts 14 and 16 and are of such length as to terminate at the parting plane 80 (Fig. 3) of the mold when the mold is closed. It will be seen, then, that the length of each pin 76 exceeds the length of each pin 34 by an amount equivalent to the height of the runners 62. The ears 22 and 24 of the knock-out plate 20 are so placed as to contact fixed stops 70 and 72 of the press (Fig. 3) when the mold is opened and if such contact proves necessary as will further appear.

The portion 14 is arranged to be heated by a heating coil 82 passing through it in serpentine fashion. Supply and discharge conduits 84 and 86 for the heating fluid are attached to the coil 82 (Fig. 1).

The sprue member 18 has an enlarged end portion 90 (Fig. 3) and fits within the tool carrying block 16, as shown. It is held in position by two set screws 92 and 94. As will be seen in Fig. 1, the sprue member 18 is provided with a sprue passage 98 extending a major portion of the length thereof and enlarged at 100 to form part of a suitable opening for injection of plastic material to the mold. Near the other or closed end of the sprue passage 98, one of the runners 62 (or the runner most remote from the opening 100) leads at right angles from the sprue passage 98. Four of the runners 62, located in the central portion of the mold, are connected to the sprue passage 98 by passages 108 formed in the part 18, as shown in Fig. 1. Each of the eight passages 108 is formed at an acute angle A to the sprue passage 98 so that the plastic material flowing to the corresponding half of a runner 62 will be constrained to pass around an angle of less than 90°. The runner 62 nearest to the opening 100 is divided into two sections as are the other runners but, preferably, it is not connected directly to the passage 98. With the particular arrangement shown in Fig. 1, the two runner sections referred to communicate with the next runner 62 by means of the twenty intervening and adjacent ring gates 64.

Four vertical pins 120 are driven tightly into holes passing through the carrier section 13 and heated portion 14 and their lower ends 122 (Fig. 3) are slightly tapered and depend below the portion 14 a distance somewhat in excess of the distance to which the mold is to be opened because of the relative movement of the press jaws.

The lower and stationary jaw 124 (Fig. 3) of the press is provided with dogs 126 arranged to cooperate therewith and retain a lower part or block 128 in operative position and in alinement with the heated portion 14. The pins 120 aid in this regard for their depending portions extend into holes 130 of the block 128 in which the portions are adapted to slide when the mold is opened and closed. Horizontal clean-out ports 132 are provided at the bottoms of the holes 130.

The pins 120 are also adapted to pass freely but with close tolerances through a removable flat plate 134 retained on the block 128 between horizontally extending guideways 138. The plate 134 has a handle 140 (Fig. 2) and has one hundred holes 142 (Fig. 6) each one proportioned snugly to receive the barrel of an eyelet blank 56 at the intersection of the barrel and flange. With the plate 134 in position on the lower block 128, the holes 142 are so arranged that each is concentric with and in vertical alinement with one of the projections 54 on a tool 50. The lower half 100A of the injection opening 100 is formed in the top portion of the block 128 and tapers upwardly through the edge of plate 134 to the parting plane 80.

The lower block 128 is adapted to be heated by a coil 150 passing through it. Hose connections 152 and 154 are connected to the coil for circulating the required heating fluid.

Thermoplastic resins such as Lumarith X (a product of the Celanese Corporation of America, New York, New York) and Ethocel (produced by Dow Chemical Company of Midland, Michigan) have been found suitable. Lumarith X is a cellulose acetate product and Ethocel is an ethyl cellulose product. Each of these is available in the form of a granulated compound and may be had in many colors.

In carrying out the operation involving the present invention the upper and lower portions of the mold are located between and attached to the jaws of a press, as shown in Fig. 3, and are heated by passing a heating fluid through the coils 82 and 150 until the diameter of the blocks has reached and is stabilized at approximately 140° F. This temperature is maintained (but with some permissible variance) throughout a production run.

Plastic granules of cellulose acetate (Lumarith X) are then heated in a hopper (not shown) to such a degree that the temperature of the plastic material at the injection nozzle will be approximately 340° F. The nozzle is not shown in the drawings but is a conventional injection nozzle proportioned to fit the injection opening 100 when the mold is closed as will be understood.

Assuming that the mold is open (that is, the upper block 10 has been raised with the upper jaw 12 of the press) the flat plate 134 is removed from the mold by means of its handle 140. The one hundred holes 142 are then loaded with one hundred eyelet blanks 56 and replaced into its position as shown in the drawings. The loading of these eyelet blanks on the plate 134 may be performed in a number of ways and is not a part of the present invention. The flange of each blank is so shaped that an annular space is retained between it and the plate 134.

The press is then operated to bring the mold parts 10 and 128 together at their parting plane 80. When the mold blocks or parts approach each other the pins 76 first contact the top surface of the lower block 128. The pins 34 are somewhat shorter as above described and they do not contact the plate 134 at any time. As the upper block or heated portion 14 descends, the pins 76 contact the lower block 128 and cause the knock-out plate 22 to rise within the channel 26 of the upper block 10 into the position illustrated in Fig. 3. When the parts are in this position it is to be noted that the lower ends of pins 34 terminate at the tops of the runners 62.

The heated and closed mold is then ready for the injection operation and the injection nozzle (with the plastic material heated to 340° F.) is seated within the opening 100 and a predetermined volume of the cellulose acetate under a pressure of approximately 20,000 pounds per square inch is injected into the sprue passage 98. The single charge of plastic material is of such volume as to fill all the communicating cavities defined by the mold which cavities provide a distribution pattern for the one hundred eyelets to be made. It may be seen from the drawings that when the two mold parts are in juxtaposition they define a distribution pattern of a sprue passage 98 communicating with the runners 62, the ring gates 64 and spaces 58 for the eyelet flanges.

It is not essential that injection pressure from the nozzle be maintained. Such pressure may be terminated immediately subsequent to the injection of a full charge. Whether it be maintained or not is immaterial as the mold temperature of about 140° F. produces a chilling effect and the injected plastic material hardens quickly.

After a dwell of eight to ten seconds the mold is opened by operation of the press and, as the upper mold part 14 rises, the knock-out plate 22 will bring its full weight down upon the plastic material of the eyelet cluster 160 because of the pins 34 resting at points 162 (Fig. 4) of the cluster. In most instances this weight will be sufficient to dislodge the cluster 160 from the under side of the upper mold block and cause the cluster to drop freely to the upper surface of the plate 134 from which it may be removed by the operator. If, perchance, the weight of the knock-out plate 22 is not sufficient to dislodge the cluster, then a continued upward movement of the press jaw 12 will cause the ears 22 and 24 to strike the stops 70 and 72. In this way the cluster 162 will be forcibly ejected by the pins 34 from the cavities or recessed portions of the member 16.

After the finished cluster 160 has been removed and the flat plate 134 has been filled with another loading of metal eyelet blanks 56, the mold is again closed and the parts assume their relative positions again, as shown in Fig. 3, and the cycle of operation is repeated to produce the next cluster.

The proper flow of plastic material from the sprue passage 98 to each of the four intermediate runners 62 must be smooth and must take place in correct sequence. The chilling effect exerted by the mold upon the incoming injected charge of plastic material gives rise to a "cold front" on that charge. It may be seen, therefore, that a very slight restriction of the flow at any point in the mold accentuates the possibility that some material will prematurely harden at that point and that cavities beyond that point may not be filled, thus resulting in defective work. As heretofore referred to, the angle A (Fig. 1) between each passage 108 and the sprue passage 98 is less than 90°. This is true with the particular construction illustrated but it does not necessarily follow that those passages should be exactly as shown. It is essential that the natural tendency of the plastic material to flow in a straight line be taken advantage of and that the metal at each point B (Fig. 1) be so formed as not to divert from the flow of material proceeding beyond that point and along the sprue passage 98. It also is important that the metal at each point C (Fig. 1) does not prematurely segregate or divert any portion of the plastic material. The metal at each point C may be formed in such a way as to present a curved instead of a pointed contour (as shown in Fig. 1) or it may form an angle of 90° or more with the sprue passage 98. With all such proposed constructions, the plastic material will first fill the most remote runner 62 and the cavities served thereby because of the form of the flow passages and the natural tendency, heretofore referred to, of the rather viscous material to flow in a straight line as it is injected. The next runner 62 will then be filled and the material will flow into a half of that runner around point C following an entrance path which is at an angle of less than 90° with the passage 98 and this flow around point C will occur because of the viscosity and rate of flow of the material even though the metal at that point may be cut away or formed with an angle of more than 90°. The degree of viscosity of the plastic material during injection (as well as the form of the passages in the distribution pattern) plays its part in determining the path of flow. With the desired flow achieved, it can be understood that, during the injection of a single charge of predetermined volume, the material will flow first to the zone of eyelet blanks most remote from the nozzle opening 100 and then progressively fill the remaining mold cavities as heretofore explained.

During continuous production of the eyelet clusters, the mold accumulates heat from the repeated charges of plastic material and loses it to the repeated loadings of metal eyelet blanks. Sufficiently accurate control of the heating fluid and mold temperature may be had using conventional temperature control devices. This avoids premature chilling during injection and undue lengthening of the time for each cycle of operation.

The approximate time interval (using cellulose acetate, a mold temperature of 140° F., a nozzle temperature of 340° F., and a pressure at the nozzle of 20,000 pounds per square inch) for a cycle of operation to produce a given cluster is as follows:

|  | Secs. |
|---|---|
| Insertion of plate 134 filled with eyelet blanks 56 | 1 |
| Closure of mold | 1 |
| Seating of nozzle | 1 |
| Injection | 1.5 |
| Dwell after injection | 8–10 |
| Opening of mold | 1 |
| Removal of cluster | 1 |
| Total cycle time | About 15 |

The cluster 160 is of such configuration that the finished eyelets 56, such as the one shown in Fig. 8, may easily be removed from the cluster by punching or severing. There is substantially no wastage of material as the remaining part of the cluster is subsequently broken up and returned to the hopper for reuse.

It is to be noted that the tool carrying block 16 and the tools 50 are of such a nature that the tools 50 may be removed and may be replaced by tools having other configurations for their working faces. The diameter and also the shoulder of each tool 50 is such that much room is left for variations in the sizes of the eyelets and the shapes of their flanges and barrels. The eyelets may be made with a round, oval or rectangular cross-section. Eyelets are produced in many sizes and shapes and the mere changing of the tools 50 to produce such sizes and shapes while retaining the main portions of the mold is a distinct advantage. The tools 50 are easily and accurately made and they may be inserted in the mold with a minimum of interruption to the production schedule.

The entrapment of air in the mold during injection presents no difficulties as the parts are not perfectly fitted and the quantity of air is small. It is preferred, however, but not essential, that the plate 134 be provided with slots 143 whereby the holes 142 communicate with the mold exterior. Only one slot 143 is shown in Fig. 2 to avoid confusion. If, in the use of a particular mold, difficulties are encountered with air trapped at the flanges of the eyelets, then either the upper or the lower part of the mold may be provided with a suitable vent groove or scratch at the parting plane.

With the method and mold as above outlined, the consistent production, in appreciable numbers, of consecutive and perfect clusters 160 has been experienced. The plastic material covering the flange of each eyelet joins with the metal of the blank at line 164 (Fig. 8) smoothly and continuously.

Having described my invention, what I claim as new and desire to secure by Letters Patent of the United States is:

1. A mold for covering flanges of eyelet blanks comprising separable mold blocks arranged to hold the barrels of eyelet blanks in spaced relation and near the parting plane of said mold blocks and with the flanges free of contact with the mold, said mold blocks when in juxtaposition defining a distribution pattern including a sprue passage communicating at various distances from the point of injection with runners leading toward the zones for holding the eyelet blanks, the intersection of the sprue passage with one of the less remote of said runners defining a path of flow around an angle of less than 90°.

2. A mold for covering flanges of eyelet blanks comprising separable mold blocks arranged, when in juxtaposition, to hold the flanges of eyelet blanks in spaced relation by contact with the inner and outer surfaces of the eyelet barrels and defining cavities adjacent the plane of the parting of the mold blocks including a sprue passage leading from a point of injection and communicating at various distances with runners, the said runners leading to ring gates and spaces for said flanges, the intersections of said sprue passage with the runners nearer the point of injection being at angles each of less than 90° for a partial reversal of flow, and a knockout plate parallel with said plane of parting and passing through one of said blocks and supporting ejection pins arranged to pass through said runners, said knockout plate and ejection pins being movable as a unit with relation to the said one block.

3. A mold for covering flanges of eyelet blanks with plastic material comprising separable mold blocks one of which is provided with a removable flat plate having holes to support the barrels of eyelet blanks in spaced relation near the parting plane of said mold blocks, the other of said blocks including interchangeable die tools concentric with said holes when the blocks are in juxtaposition and defining ring gates and spaces for the flange covers to be made on blanks supported by said flat plate, a sprue passage defined by the blocks in juxtaposition and runners leading from said sprue passage and communicating with the said ring gates and spaces, a knockout plate with ejection pins arranged to move as a unit with respect to one of said blocks and perpendicular to said parting plane, said pins passing through said one block to said runners, and the intersections of the sprue passage with some runners each defining a partially reversed path of flow in relation to the direction of flow in said sprue passage, the arrangement being such as to cause plastic material first to be injected along said sprue passage to a runner more remote from the point of injection.

4. A mold for covering flanges of eyelet blanks with plastic material comprising separable mold blocks arranged to hold eyelet blanks in spaced relation adjacent the parting plane, one of said blocks being arranged to contact and support the barrels of said blanks, the other of said blocks having cavities including a sprue passage leading from a point of injection into the mold, runners, and a ring gate and space for the flange of each of said blanks, said cavities defining a distribution pattern with flow passages leading from said sprue passage to those ring gates nearer the said point of injection in directions partially reversed in relation to the direction of flow in said sprue passage.

5. A method of covering flanges of metal eyelet blanks which comprises enclosing the flange of each of a number of such blanks in spaced relation within wall surfaces of a cavity from which the corresponding eyelet barrels are sharply excluded, injecting a single charge of plastic material from a given point into said cavity first to embed the enclosed flanges most remote from said point, and continuing the injection of said charge without interruption while partially reversing the paths of portions of said material directed to flanges less remote from said point.

SYLVESTER L. GOOKIN.

REFERENCES CITED

The following references are of record in the file of this patent:

UNITED STATES PATENTS

| Number | Name | Date |
| --- | --- | --- |
| 1,188,423 | Elliot | June 27, 1916 |
| 2,439,782 | Schmid et al. | Apr. 13, 1948 |
| 2,440,960 | Kuzmick | May 4, 1948 |

OTHER REFERENCES

Injection Mould Design by Tennessee Eastman Corp., October, 1940, pages 147–156, Br. Plastics.